Nov. 5, 1968    R. K. BARNES    3,409,289
SPRING FEEDER APPARATUS
Filed June 20, 1967

INVENTOR.
RALPH K. BARNES
BY Boyce C. Dent
his Attorney

United States Patent Office 3,409,289
Patented Nov. 5, 1968

3,409,289
SPRING FEEDER APPARATUS
Ralph K. Barnes, Lutherville, Md., assignor to Koppers
Company, Inc., a corporation of Delaware
Filed June 20, 1967, Ser. No. 647,517
5 Claims. (Cl. 271—61)

ABSTRACT OF THE DISCLOSURE

An improved spring feeder assembly for mounting on a reciprocating feeder bar to advance corrugated paperboard blanks into blank processing machinery comprising a plate of spring steel with a lip secured to its trailing edge for gripping the trailing edge of a blank and with its leading edge formed in an angular portion for gripping the leading edge of the feeder bar, the plate being secured to the bar by an angular member corresponding to the angular portion bolted to the bar in overlapping relation to the angular portion to shift the point of flexure of the plate to a line behind the leading edge of the bar.

BACKGROUND OF THE INVENTION

Field of the invention

This invention relates generally to sheet feeding and more particularly to feeding separators of the pack advancing type.

Description of the prior art

In the manufacturing of boxes, single blanks are fed one at a time from a stack of box blanks into machinery for operations on the blanks such as printing, slotting, scoring and the like. In a spring feeder assembly such as illustrated, for example, in Palamenti Patent No. 3,265,386, a back-stop bar and a spring feeder cooperate to feed a blank into the adjacent machinery. The spring feeder is comprised of a plurality of spring feeder plates at laterally spaced intervals secured to a reciprocating feeder bar. A lip portion at the trailing edge of each spring feeder plate engages the trailing edge of a blank for advancing the blank into the machine for subsequent processing, such as a printer-slotter. As the feeder bar moves rearwardly in its reciprocating, the lip of the feeder plate is depressed and is moved behind the trailing edge of the lowermost blank of the stack of blanks. Then as the feeder bar moves forwardly, the lip rises and engages the lowermost blank and urges it forward from under the stack. The trailing edge of the stack rests on a plurality of supports usually referred to as back-stops. The leading edge of the stack is supported by the feed table so that the stack is inclined with respect to the reciprocating path of the feeder bar. As the bar reciprocates, the spring feeder plates are compressed on the forward stroke and released on the backward stroke.

In operation, the spring feeder plates are flexed as many as five times per second. Consequently, the spring feeders tend to fatigue and crack and must be replaced frequently. Fatigue is hastened where the stress is greatest and this stress tends to occur where the leading edge of the spring steel plate of the feeder is bent at right angles downward from horizontal to provide a flange through which several screws are used to secure the feeder to the front surface of the feeder bar. Although the plate is bent upward approximately 15 degrees from the horizontal at a short distance back from the right angle bend so that the spring feeder is inclined to the horizontal when mounted on the feeder bar, most of the flexing of the feeder tends to take place in the sharp right angle bend line forming the front mounting flange. As a result, the feeder plates crack at the right angle bend line; fretting occurs where the screw heads meet the flange; and the plates sometimes crack at the screw apertures as well as at the bend line.

Summary

The invention contemplates the provision of a spring feeder assembly in which the spring feeder plate is secured to the feeder bar by a clamp having a right angular cross-section which overlies both the flange portion and the adjacent flat portion of the spring feeder plate that is in contact with the feeder bar. The clamp is mounted to the feeder bar by a pair of screws. Preferably, the clamp is longer than the width of the spring feeder plate so that the mounting screws can be threaded into the existing holes in the feeder bar, and the improved feeder assembly can be readily substituted for existing feeder units.

The beneficial effect of the spring feeder assembly of this invention is that flexing of the spring feeder plate has been eliminated from the sharp right angle bend line forming the flange and is restricted to the less sharp bend line at which the plate becomes inclined to the horizontal.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

Figure 1:
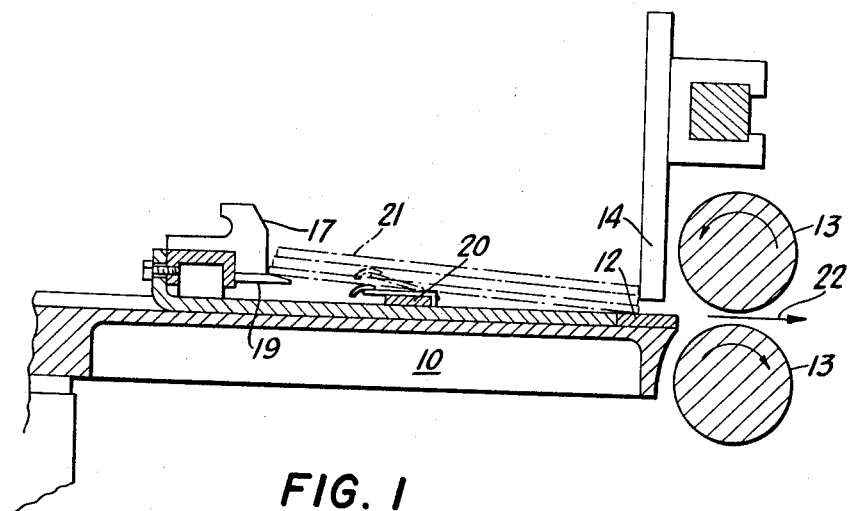
FIGURE 1 is a sectional elevational view of a box blank supporting mechanism incorporating an embodiment of the spring feeder assembly of the invention.

Illustrated in FIG. 1 is a box blank support device such as described in Palamenti Patent No. 3,265,386. A bar 12 extends transversely across the support bed 10 at the end adjacent to feed rolls 13. Gate 14 is positioned above the bar 12 to pass a single box blank into contact with the feed rolls 13. A stack of box blanks 21 are positioned on the bed support 10. The front edges of the box blanks abut the depending gates 14 and the rear edges are elevated with the rear edge of the lowermost blank resting on the ledge 19 of back-stop 17. Reciprocation of the spring feeder bar 20 removes the lowermost blank and feeds it to the receiving rolls 13.

Figure 2:
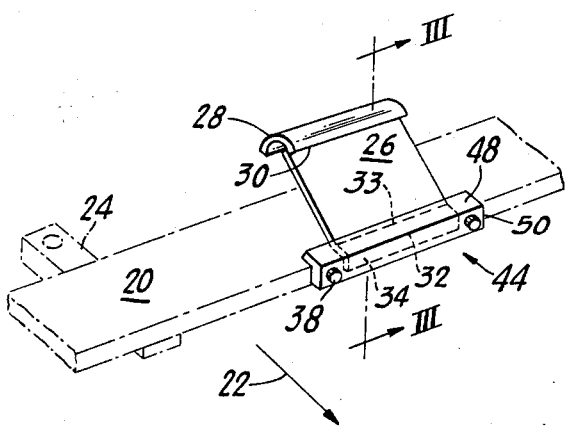
FIGURE 2 is an isometric view of a portion of a spring feeder bar showing an embodiment of the spring feeder of the invention mounted thereon.

Feeder bar 20, FIG. 2, extends transversely to the direction of blank feed travel as indicated by arrow 22. Feeder bar 20 is usually secured to a reciprocating member (not shown) provided in a blank feeding machine by a mounting member 24 secured in a convenient manner to the bar 20.

In accordance with this invention, the spring steel feeder plates have a generally rectilinear shape. Each spring steel feeder plate 26 has a lip portion 28 secured to it in the known manner. Lip portion 28 has a sharp edge 30 for engagement with the trailing edge of a blank. The leading end of plate 26 terminates in a member that is bent at a right angle at line 32, thereby forming a flange 34.

The trailing end of plate 26 is urged at the desired angle to the horizontal, 15 degrees for example, because of a bend line 33 that is located at a distance from bend line 32 about equal to the depth of flange 34. Lines 32 and 33 are parallel and extend transversely across plate 26.

Figure 3:
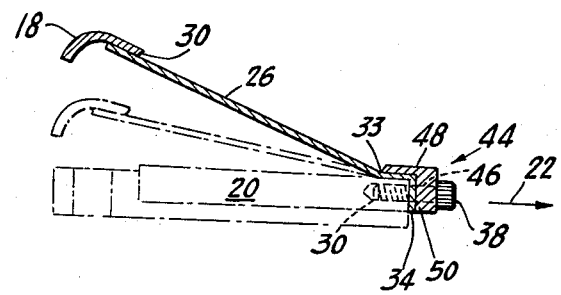
FIGURE 3 is a cross-sectional view of the improved spring feeder assembly taken along line II—II of FIG. 1.

A clamp 44 secures the spring feeder plate 26 to the bar 20. Clamp 44 is in cross-section in the form of an angle having a top leg 48 and a front leg 50. Clamp 44 overlies the right angle portion of the plate 26, FIG. 3, and extends beyond the edges of the plate. Cap screws 38 pass through holes 46 in the clamp and thread into holes 30 in the bar 20 to secure both the clamp 44 and plate 26 to the bar 20. The top leg 48 of clamp 44 extends substantially to bend line 33 in plate 26. The top leg 48 may be chamfered, if desired, where it meets bend line 33 so that the leg does not dig into plate 26 during flexure of the plate.

Thus, it can be seen that during operation, bend line 32 is restrained tightly against bar 20 so that it cannot flex. Flexing is constrained to occur in bend line 33 when the feeder is compressed to the position shown by the dotted lines in FIG. 3. Long working life of the feeder plate 26 is achieved since flexure in bend line 33 does not fatigue the spring steel beyond its elastic limit. In addition, no fretting between the heads of the screws 38 and the plate 26 can take place.

If desired, the clamp 44 need not extend beyond the edges of plate 26 but can be equal width. In this form, clearance holes would be provided in flange 34 through which cap screws 38 would be threaded in bar 20.

Having thus described my invention in its best embodiment and mode of operation, what I desire to claim by Letters Patent is:

1. A spring feeder assembly of the flexible type comprising:
   a feeder bar,
   a generally rectangular spring plate,
   a lip portion on the trailing edge of said spring plate for engagement with the trailing edge of a blank,
   a flange portion at the leading edge of said spring plate extending at substantially right angles to said plate for engagement with said feeder bar,
   a bend line between said flange portion and said lip from which the lip end of said plate is urged to incline upwardly, and
   clamp means overlying said flange portion and extending from the leading edge to abut said bend line and secured to said feeder bar for maintaining said plate in engagement with said bar,
   whereby flexing of said plate is constrained to said bend line.

2. The feeder assembly of claim 1 wherein:
   said plate has a first bend line at a substantially right angle forming said flange portion adapted for engagement with the leading edge of said feeder bar and a second bend line parallel to and behind said first bend line forming an inclined portion in said plate; and
   said clamp means comprises a right angle clamp having a top leg extending to said second bend line and a front leg overlying said flange portion and extending across the leading edge of said feeder bar and having an aperture therein for a retaining means for securing said plate and said clamp to said feeder bar.

3. The feeder assembly of claim 2 wherein:
   said right angle clamp has end portions extending beyond the lateral edges of said plate with each end portion having an aperture therein; and
   said retaining means comprises a screw extending through each of said apertures and into said feeder bar,
   whereby said screws secure said clamp to said bar and said clamp secures said plate to said bar.

4. A spring feeder assembly for feeding a lowermost blank from a stack of blanks upon the forward and return reciprocation of a feeder bar comprising:
   a generally rectangular shaped sheet of spring metal, the leading edge of said sheet being bent along a first bend line transversely of said sheet downwardly at an angle normal to the datum plane of said sheet to form a flange for engaging said feeder bar,
   said first bend lines representing a first zone of weakness,
   the trailing end of said sheet being bent upwardly along a second bend line generally parallel to said first bend line upwardly at an acute angle relative to the datum plane of said sheet,
   said second bend line representing a second zone of weakness,
   a lip portion at the trailing end of said sheet for engaging a blank,
   whereby upon the forward movement of said bar a lowermost blank is fed from said stack and upon the return motion of said bar the incline trailing end of said sheet bends toward said datum plane to pass under said stack, and
   means for protecting said first zone of weakness and constraining said sheet to bend at said second zone of weakness.

5. The assembly of claim 4 wherein the means for protecting said first zone of weakness and constraining said sheet to bend at said second zone of weakness comprises:
   a bar overlying said sheet for holding said leading end of said sheet against movement,
   whereby said sheet must bend at said second bend line.

References Cited

UNITED STATES PATENTS

| | | | |
|---|---|---|---|
| 161,903 | 4/1875 | Rodgers | 198—221 XR |
| 3,223,223 | 12/1965 | Fuhrmann | 198—221 XR |
| 3,265,386 | 8/1966 | Palamenti | 271—61 |

EVON C. BLUNK, *Primary Examiner.*

R. J. HICKEY, *Assistant Examiner.*